Nov. 12, 1968 B. V. HEWES 3,411,131
EMERGENCY EXIT SIGNAL DEVICE FOR AIRCRAFT
Filed Oct. 5, 1965 5 Sheets-Sheet 1

INVENTOR.
BASIL VICTOR HEWES
BY Sperry and Zoda
ATTORNEYS

Nov. 12, 1968     B. V. HEWES     3,411,131
EMERGENCY EXIT SIGNAL DEVICE FOR AIRCRAFT
Filed Oct. 5, 1965     5 Sheets-Sheet 2

INVENTOR.
BASIL VICTOR HEWES
BY Sperry and Goda
ATTORNEYS

INVENTOR.
BASIL VICTOR HEWES
BY Sperry and Yoda
ATTORNEYS

INVENTOR.
BASIL VICTOR HEWES
BY Sperry and Zoda
ATTORNEYS

United States Patent Office 3,411,131
Patented Nov. 12, 1968

3,411,131
EMERGENCY EXIT SIGNAL DEVICE FOR AIRCRAFT
Basil Victor Hewes, College Park, Ga., assignor to Aero Safety Devices, Inc., Trenton, N.J., a corporation of New Jersey
Filed Oct. 5, 1965, Ser. No. 493,145
7 Claims. (Cl. 340—27)

ABSTRACT OF THE DISCLOSURE

A normally off light, mounted between the inner and outer walls of an aircraft fuselage, is illuminated by closure of an inertia switch responsive to the impact of an aircraft crash. The light includes one or more lamps disposed between translucent panels mounted in the inner and outer walls adjacent an emergency exit. The device projects a brilliant light signal through the exterior panel to aid a rescue party in locating the aircraft and in particular the exit, and simultaneously projects a softer light through the inner panel to show the passengers the exit location.

---

This invention relates generally to emergency illuminating and signaling devices intended for use mainly in aircraft, and adapted to operate under serious impact or distress conditions resulting from crashing of the aircraft.

It is worthy of observation, by way of background, to note that when an aircraft crashes, a delay of even a few seconds in evacuation of the aircraft by survivors of the crash becomes, in the literal sense of the term, a matter of life or death. Aircraft crashes have occurred, for example, in realtively shallow water, which may yet be deep enough to submerge the aircraft. In such instances, survivors must obviously locate emergency exits and evacuate the craft with all possible speed. Moreover, rescue teams must be able to locate the aircraft as promptly as possible and be guided to any accessible emergency exits which may not have been opened due to jamming on impact or for any other reason. Their failure to do so can be fatal, and has in fact caused considerable loss of life in crashes that have occurred, as evidenced by the fiindings of investigators of such crashes.

It is important that a device intended to operate responsive to crash conditions be normally inconspicuous, since it has been found by airline mangement that passengers, particularly those whose flight experience is limited, view with considerable apprehension any visible indications or reminders that the aircraft is capable of crashing and might in fact do so.

It is further important that an illuminating device for locating the emergency exits of aircraft to be designed to operate instantly in response to sudden impact such as occurs when the aircraft strikes the water or the ground under crash conditions. It is obviously of equal importance that such a device be rugged enough to withstand extreme deceleration forces resulting from the impact of the aircraft against the water or ground, without adverse effect on the operability or efficiency of the device in the discharge of its intended function.

The discussion above, of the background and problems leading to development of the present invention, has related mainly to the provision of an interiorly disposed emergency light for aircraft, visible instantly on impact, to the passengers for the purpose of swiftly locating emergency exits. In this connection, while the interior lighting of such exits is of great, possibly even of primary importance, such lighting should not be so brilliant or operated in a manner which might add to confusion. On the other hand, it is also of great concern to operating airlines and to crash-locating and investigating agencies that the wrecked aircraft be found with an absolute minimum of delay. Thus, one of the problems that has constantly harassed rescue squads has been an inability to make a prompt determination of the location of the aircraft and its exit hatches, since the crashed plane is usually engulfed in smoke, fog or foam. Painted exit markings on the exterior of the fuselage are difficult to locate under such conditions. In order to achieve maximum efficiency in rescue operations groping and searching for the emergency exit doors or windows must be eliminated. A brilliant light issuing outwardly from a port in the fuselage directly adjacent the emergency exit hatch will be immediately visible to all approaching rescue teams, especially if the light flashes on and off. Therefore, a powerful externally visible signal light will speed rescue operations regardless of the poor conditions of visibility brought on by smoke, fog, chemical foam, etc. Obviously, this is of especial importance not only because rescuers may be able to save lives by swift initiation of rescue operations, but also because investigation of the causes of the crash is brought to its maximum efficiency if the procedures incident thereto are begun before deterioration or loss of the parts of the wrecked craft, whether intact or fragmented.

In view of all the above, I have proposed to provide a device which will respond instantly to sudden impact resulting from the crash of an aircraft, in such a way as to place into operation, substantially at the moment of impact, means which will, at one and the same time, provide both an adequate interiorly disposed emergency exit locator light which will not confuse passengers endeavoring to escape from the aircraft, and a brilliant exteriorly projected, visible signal which may be seen from a great distance so as to facilitate the location of the aircraft by search agencies.

Among important objects of the present invention, in this regard are the following:

To provide a device of the character stated which will discharge both adequate interior and brilliant exterior signaling functions noted above, though still comprising a single, compact, unitary assembly;

To provide a device as stated which, under normal conditions, will be so inconspicuously designed and located as to pass unnoticed by the casual viewer;

To provide an emergency exit locator light which will utilize a combination of one or more lamps, an exterior transparent or translucent panel, and an interiorly facing translucent panel, in such a way as to project to the exterior of the aircraft light beams of maximum intensity so as to facilitate location of the craft by search parties, while at the same time providing a diffused lighting of emergency exits within the aircraft, in a manner that will not confuse or unduly alarm passengers seeking emergency exits;

To provide a device of the character stated which will be so designed as to be installed with speed and ease in existing aircraft of different types, with minimum modification or redesign either of the aircraft structure or of the device itself;

To provide an emergency light assembly as stated above that will comply fully with all existing or anticipated requirements of both regulatory agencies and operating national and international airlines;

To so form a device of the character stated as to impart thereto a high degree of ruggedness, strength, durability, and adaptability for sure and trouble-free operation under emergency conditions; and To provide an emergency exit locator light which if desired, can be operated manually rather than by automatic response to sudden impact, and which also can be turned off manually in the event it is set into operation accidentally.

Other objects will appear from the following description, the claims appended thereto, and from the annexed drawings, in which like reference characters designate like parts throughout the several views, and wherein:

Figure 1:
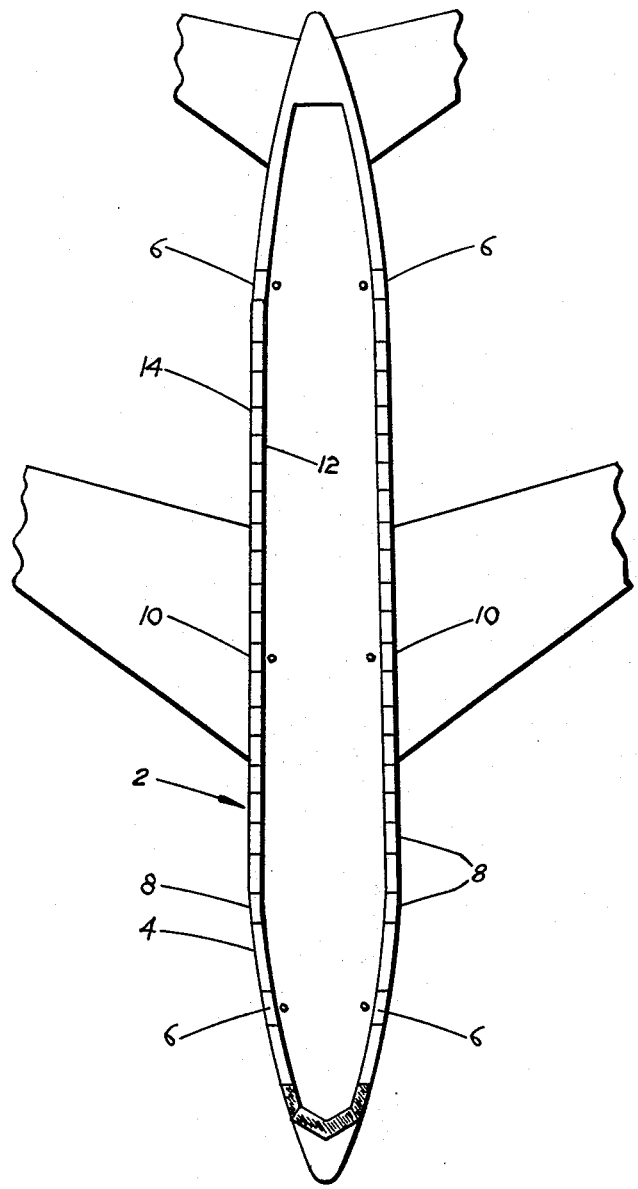
FIG. 1 is a diagrammatic longitudinal sectional view of a typical aeroplane embodying the present invention.
Figure 2:
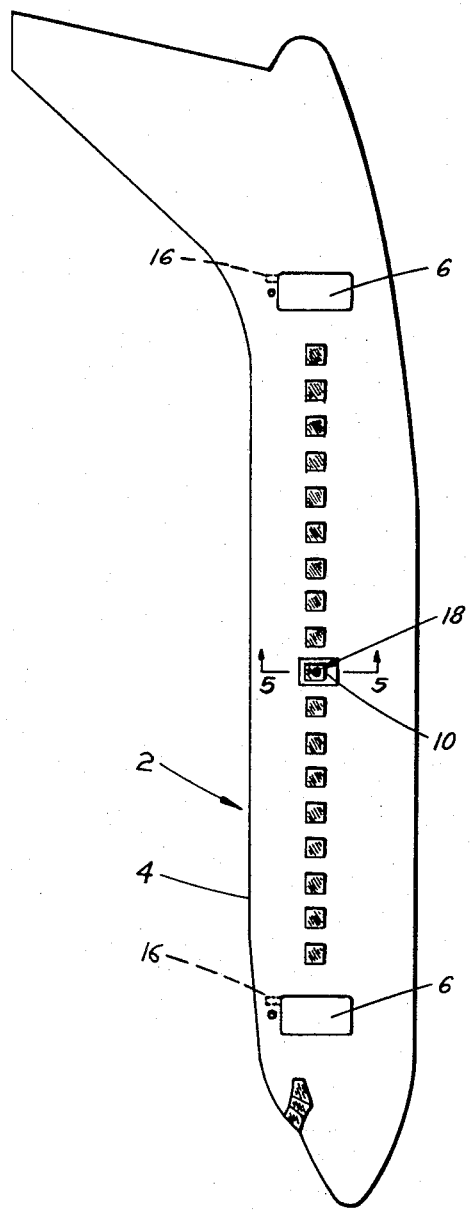
FIG. 2 is a side elevation of the aeroplane illustrated in FIG. 1.
Figure 4:
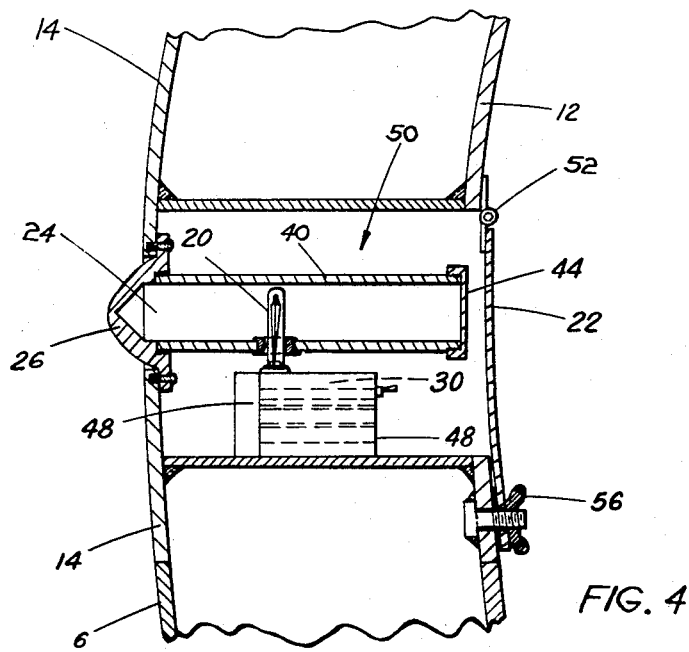
FIG. 4 is a vertical sectional view through the emergency escape door of FIG. 3 taken on the line 4—4 thereof.
Figure 3:
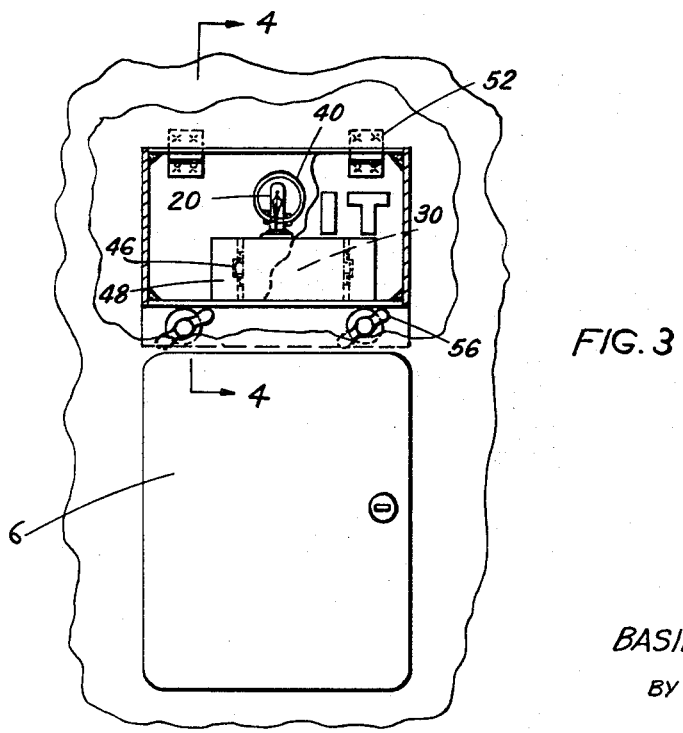
FIG. 3 is an elevation of a typical emergency door and adjacent portions of the aeroplane shown in FIGS. 1 and 2 as seen from the exterior with a portion of the fuselage broken away.

In that form of the invention chosen for purposes of illustration in the drawings, the aeroplane 2 has a fuselage or cabin 4 with service and emergency exit doors 6 and windows 8 including an emergency exit window 10. The cabin has an inner wall 12 and an outer wall 14 spaced therefrom which may be of any usual or preferred construction and configuration. Equipment 16 embodying the present invention is mounted in the aircraft adjacent the emergency exit doors 6 and between the inner and outer walls 12 and 14 of the fuselage. Similarly, other devices 18 may be mounted in or adjacent the emergency exit windows 10 if desired.

Figure 6:
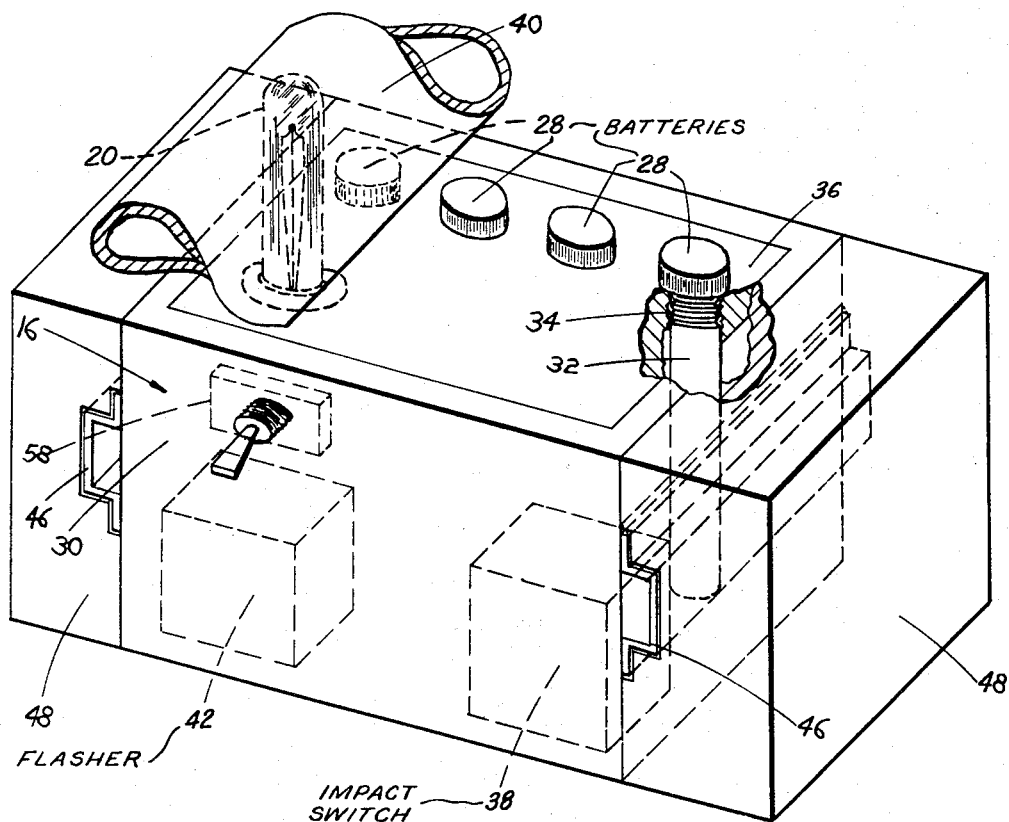
FIG. 6 is a perspective view partly broken away illustrating a typical unit which may be employed in accordance with the present invention.

The equipment 16 mounted adjacent the doors 6 include a lamp 20 together with an inwardly facing translucent panel 22 for indicating to the passengers and crew members within the aircraft the location of the exit door 6, and has an outwardly facing aperture 24 provided with a "bug-eye" or other lens 26 through which light from the lamp 20 may be projected. The lamp 20 is powered by batteries 28 housed within a container 30 and connected in parallel to the lamp so that failure of any battery in the assembly will not prevent illumination of the lamp 20. In a preferred construction as illustrated in FIG. 6, the individual batteries 28 may be of the 6 volt nickel-cadmium or mercury type and provided with an outer shell 32 which is threaded at 34 for fixed and positive engagement with a cover plate 36 hermetically sealed to the container 30. An impact switch 38 is also located within the container 30 and may be of any conventional or preferred type adapted to be actuated in response to an inertia force of, say 1 to 5 g's in a horizontal direction.

The lamp or light 20 preferably is mounted on the cover plate 36 of the container 30 and is located within a light directing "Lucite" or other tube 50 between the translucent inwardly facing panel 22 above or adjacent the emergency exit door 6 and the outwardly facing panel or lens 26 so that light therefrom will be projected through both panels from a single lamp. A conventional "flasher" or intermittently operable circuit breaker 42 preferably is connected into the circuit between the lamp 20 and batteries 28 to cause the light to be flashed on and off or otherwise operated in a manner to attract attention thereto.

In a typical and preferred installation, the elements of the assembly employed in the equipment 16 are designed when actuated by operation of impact switch 38 to provide a peak illumination from the lamp 20 of 100,000 lumens and to continue to flash at the rate of 40 times per minute for at least 24 hours. Light from such a lamp when projected outwardly through the transparent panel or lens 26 will be visible on a clear night for a distance of 3 miles or more and for a distance of 2000 feet or more even in a fog. Moreover, such a brilliant light will show brightly through dense smoke, foam or the like on the exterior of the aircraft so as to guide rescue squads directly to the emergency exits and enable them to open the doors from the outside even if they have become jammed in a crash landing.

The light from lamp 20 which is projected inwardly to the cabin through the translucent panel 22 should be so subdued or diffused that it will not blind, confuse or excite the passengers. Accordingly, for most purposes, a translucent light diffusing shield 44 may be secured to the inner end of the tube 40 between the lamp 20 and the translucent panel 22 to subdue or diffuse inwardly directed light from the brilliantly illuminated lamp 20. In this way, adequate internal illumination is assured and a relatively subdued flashing signal is provided to indicate to the passengers in the cabin the location of the emergency exit doors 6. Such a signal will enable passengers, hostesses or those in command to find and operate the exit doors even though there is considerable confusion, smoke and debris within the cabin.

The construction thus provided serves to insure the most brilliant external illumination and signal sources for guiding and aiding rescue teams while at the same time providing a limited but adequate diffused signal light within the aircraft which will afford a clear indication as to the location of emergency doors enabling the passengers, hostesses or crew to locate and operate the exit doors from the interior of the cabin.

In order to permit installation of equipment embodying the present invention in conventional and existing aircraft adjacent the emergency doors 6, the container 30, with the batteries and flasher housed therein, is provided with guides 46 positioned to be received in recesses in supporting means 48 mounted in a cavity 50 between the inner and outer walls 12 and 14 of the cabin and above the emergency exit doors 6. The container 30 can thus be inserted into the cavity 50 for easy installation and for replacement and repair of the equipment 16. The inwardly facing transparent panel 22 then may be in the form of a closure plate hingeably connected at 52 to the inner wall 12 of the cabin adjacent the upper edge of the cavity 50. The panel 22 may be held in its normal closed position by a suitable catch or retaining means 56 but may nevertheless be raised when desired to provide access to a manual switch 58 mounted on container 30 of the unit 16. In this way, the device may be controlled manually to enable the aircraft personnel to turn off the signal in the event it should be accidently actuated for any reason, but it can be switched back to an operative condition for renewed operation under the action of the impact switch in the event of a crash or emergency landing.

Figure 5:
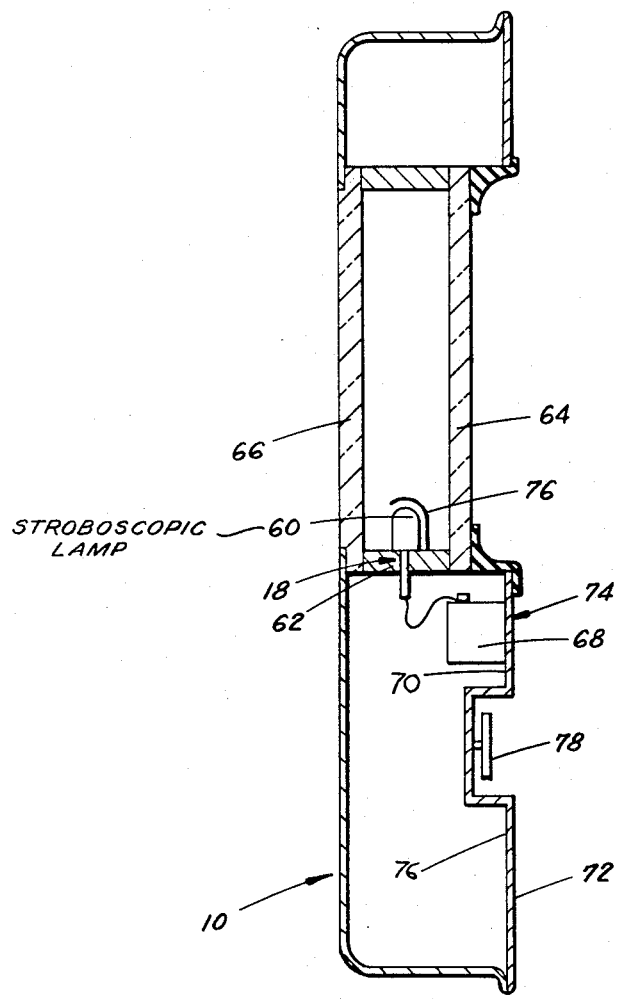
FIG. 5 is a vertical sectional view of an emergency escape window of FIG. 2.

If desired, a device 18 embodying the present invention can be mounted in an emergency exit window 10. Thus, as shown in FIG. 5, the light 60 may be mounted on the sill 62 of the window between the inner and outer glass panels 64 and 66. The battery container 68 may then be mounted on the outer face 70 of the inner wall member 72 of the window assembly in such a way that the manually operable switch handle 74 will be accessible for use if necessary. The light 60 is provided with an opaque reflecting element 76 which is positioned between the light and the inner glass pane 64 so that limited but adequate light from the window will be diffused into the cabin of the aricraft to provide a subdued signal indicating to the passengers and crew the location of those windows which are designed for emergency escape from the aircraft. At the same time, a brilliant reflected light will be directed outwardly to serve as a signal and illumination for rescue workers to aid in locating the aeroplane and the escape openings or windows through which passengers may leave or be removed from the aircraft.

The light 60 is preferably of such a size and so located as to be quite inconspicuous when not in use but to be effective when lighted to indicate the location of the emergency window and to illuminate the handle 78 by which the window can be operated for removal. Further-more, the enclosure of the light 60 within the window between the sealed panes or glass panels 64 and 66 serves to protect it against damage or the action of water or moisture even when the plane is submerged for some time.

The circuitry employed for illuminating and controlling the operation of the lamp 20 or light 60 may be of any suitable type as exemplified by that shown and described in U.S. Patent No. 2,905,863. Similarly, the impact switch employed for emergency operation of such a circuit may be of any preferred type as exemplified by that disclosed in U.S. Patent No. 3,038,973 for example.

It will thus be apparent that equipment embodying the present invention is adapted to be installed in existing aircraft with little or no change or modification thereof. Nevertheless, the particular form, shape and arrangement of the various elements of the combination are capable of numerous modification and variations in design to permit ready installation thereof in any particular design or type of aircraft. In view thereof, it should be understood that the particular embodiments of the invention shown in the drawings and described above are intended to be illustrative only and are not intended to limit the scope of the invention.

I claim:

1. Emergency signaling means for aircraft having a fuselage embodying spaced inner and outer wall members with at least one emergency escape opening therethrough, said signaling means comprising equipment mounted between said inner and outer members and including a light, a source of electrical energy for illuminating said light and an electrical circuit including an inertia responsive switch for controlling said circuit to cause said light to be illuminated by current from said source of electrical energy upon operation of said inertia responsive switch, a translucent panel in said outer wall member of the fuselage adjacent said light for providing a brilliant outwardly directed signal light to aid rescue crews in locating the aircraft and said emergency escape opening when said inertia responsive switch is actuated, and a translucent panel mounted on the inner wall of the fuselage and facing inwardly therefrom adjacent said light for indicating the location of said emergency escape opening to persons within the fuselage upon operation of said inertia responsive switch.

2. Emergency signaling means as defined in claim 1 wherein said electrical circuit also includes a manually operable switch.

3. Emergency signaling means as defined in claim 1 wherein said electrical circuit also includes a circuit breaker operable to make and break said circuit intermittently to produce a flashing signal.

4. Emergency signaling means as defined in claim 1 wherein said emergency escape opening is in the form of a door and said light and the translucent panels adjacent thereto are mounted in the fuselage adjacent to said door.

5. Emergency signaling means as defined in claim 1 wherein said emergency escape opening is in the form of a window and said light is mounted in said window between inner and outer glass panes thereof.

6. Emergency signaling means for use in aircraft having a fuselage provided with spaced inner and outer walls, said signaling means including a light located between said inner and outer walls adjacent an emergency escape opening therethrough, a container having a plurality of batteries located in fixed positions therein and connected in parallel to said light to illuminate the same, an inertia responsive switch also located in said container and operable to control said circuit, said container being sealed and mounted in a fixed position between said inner and outer walls of the fuselage adjacent said emergency escape opening, said inner wall having a translucent panel thereon adjacent said light for affording subdued illumination of the interior of the fuselage in a position to indicate the location of said emergency escape opening, and the outer wall of said fuselage having a translucent panel therein adjacent said light for affording brilliant illumination directed outwardly from said fuselage to afford a signal to enable resuce workers to locate the aircraft and said emergency escape openings from the interior of the aircraft.

7. An emergency escape window for aircraft comprising a frame, inner and outer spaced translucent panes mounted in said frame, means carried by said window for providing an inwardly directed signal to enable passengers to locate said window in the event of an emergency and to enable persons outside of the aircraft to locate the aircraft and said window, said means including a light mounted on the sill of said window between said inner and outer panes thereof, a container secured to said window and having batteries fixedly secured therein and connected to said light by an electrical circuit to illuminate said light, an inertia responsive switch located in said container and included in said circuit to complete said circuit and cause said light to be illuminated upon operation of said inertia responsive means, and a reflecting light shield located on the window sill between said translucent panes and on the side of said light closer to the inner of said translucent panes to reflect and project light outwardly from said window and to limit the amount of light projected into the aircraft from said light.

No references cited.

JOHN W. CALDWELL, *Primary Examiner.*

ALVIN H. WARING, *Assistant Examiner.*